United States Patent

Padalino et al.

[15] 3,668,560

[45] June 6, 1972

[54] PULSE-WIDTH FREQUENCY MODULATION DEVICE

[72] Inventors: Joseph J. Padalino, West Orange, N.J.; Alfons A. Tuszynski, San Diego, Calif.

[73] Assignee: Research Corporation, New York, N.Y.

[22] Filed: July 9, 1970

[21] Appl. No.: 53,435

[52] U.S. Cl. ....332/9, 307/265, 318/341, 325/142, 328/58

[51] Int. Cl. ....H03k 7/08

[58] Field of Search ....318/341; 332/9, 9 T, 10, 48; 328/58; 307/265; 325/142

[56] References Cited

UNITED STATES PATENTS

| | | | |
|---|---|---|---|
| 3,253,228 | 5/1966 | Montner | 332/10 X |
| 3,489,853 | 1/1970 | Lang | 328/58 X |
| 3,274,514 | 9/1966 | Foulger | 328/58 X |
| 3,478,170 | 11/1969 | Hanni | 332/9 X |
| 3,523,259 | 8/1970 | Fein | 332/9 |
| 3,513,400 | 5/1970 | Russell | 332/9 X |

*Primary Examiner*—Alfred L. Brody
*Attorney*—Brumbaugh, Graves, Donohue & Raymond

[57] ABSTRACT

As described herein, a train of pulses used to control a servomotor is modulated in accordance with the values of a varying digital input signal. To obtain accuracy of control, the digital input signal is divided into two components; a first group of bits representing integer order values; and a second group of bits representing fractional order data. A modulating circuit responds to the integer order bits to width modulate the pulse train in accordance with the magnitude represented by the integer order bits. The fractional order data bits are accumulated until the sum thereof at least equals the value of the least significant bit of the integer order component. At this time, the sum signal is added to the integer order data to add an increment of width modulation to the pulse then being modulated.

6 Claims, 12 Drawing Figures

INVENTOR

Brumbaugh, Graves, Donohue & Raymond
ATTORNEYS

INVENTOR

Brumbaugh, Graves, Donohue & Raymond
their ATTORNEYS

INVENTOR

Brumbaugh, Graves, Donohue & Raymond
their ATTORNEYS

INVENTOR

Brumbaugh, Graves, Donohue + Raymond
ATTORNEYS

INVENTOR

Brumbaugh, Graves, Donohue & Raymond
ATTORNEYS

PULSE-WIDTH FREQUENCY MODULATION DEVICE

BACKGROUND OF THE INVENTION

This invention relates to modulating devices, and, in particular, to apparatus for combining in a unique and novel manner pulse width and pulse frequency modulation techniques to provide a pulse-width frequency modulation device.

Linearity and efficiency are important characteristics for power drivers employed for servo-control applications. The linearity of the power driver affects the dynamics and accuracy of the servo-control system while the efficiency determines the excess power needed for the system. Low efficiency results in the need for heat dissipation accessories and excessive demands on the power sources.

Modern servo-control systems employ either pulse-frequency modulation or pulse-width modulation techniques to achieve controlled and accurate performances. Pulse-frequency modulation supplies the advantageous effect of being highly linear over the entire range of operation, especially at low signal levels. Pulse-width modulation, on the other hand, is more efficient then pulse-frequency modulation because of the increased basic output quantum. However, pulse-width modulation does not provide substantial linearity over a wide range of signal levels.

SUMMARY OF THE INVENTION

The present invention combines the advantages of both pulse-frequency modulation and pulse-width modulation techniques and, at the same time, eliminates the disadvantages attendant such techniques. Furthermore, whereas the older pulse-frequency modulation and pulse-width modulation systems converted analog inputs into pulsed outputs, the present invention provides an all digital system wherein digital inputs are converted to pulsed outputs. This latter characteristic is of particular importance in modern systems that, generally, are operated by digital computers.

According to the present invention, a modulating system responds to input signals having both magnitude and frequency information to modulate a train of pulses representative of servo-control or the like signals. The modulating system includes a circuit for width modulating the pulses of the pulse train in accordance with the magnitude information and a circuit for further modulating the widths of certain pulses in the pulse train in accordance with the frequency information.

In a preferred embodiment of the invention, the digital input is divided into two components: a first group of bits representing integer order values; and a second group of bits representing fractional order data. The modulating circuit responds to the integer order bits to width modulate the pulse train in accordance with the magnitude represented by the integer order bits. The fractional order bits are accumulated until the sum thereof at least equals the value of the least significant bit of the integer order data. At this time, the sum signal is added to the integer order data to add an increment of width modulation to the pulse then being modulated.

DESCRIPTION OF THE PREFERRED EMBODIMENT

For purposes of descriptive clarity, the pulse-modulating apparatus of the present invention is described herein for digital input signals having a two's complement format. Each input signal includes a sign bit, an integer order component following the sign bit and weighted in positive powers of 2, and a fractional order component following the integer order component and weighted in negative powers of 2. Thus, an input word of twelve bits (one sign, six integer order bits and five fractional order bits) and having the form:

000010010000 is written as 0000100.10000 and read as +4.5 decimal; while the signal

100010011000 is written as 1000100.11000 and read as −59.25 decimal.

Figure 1:
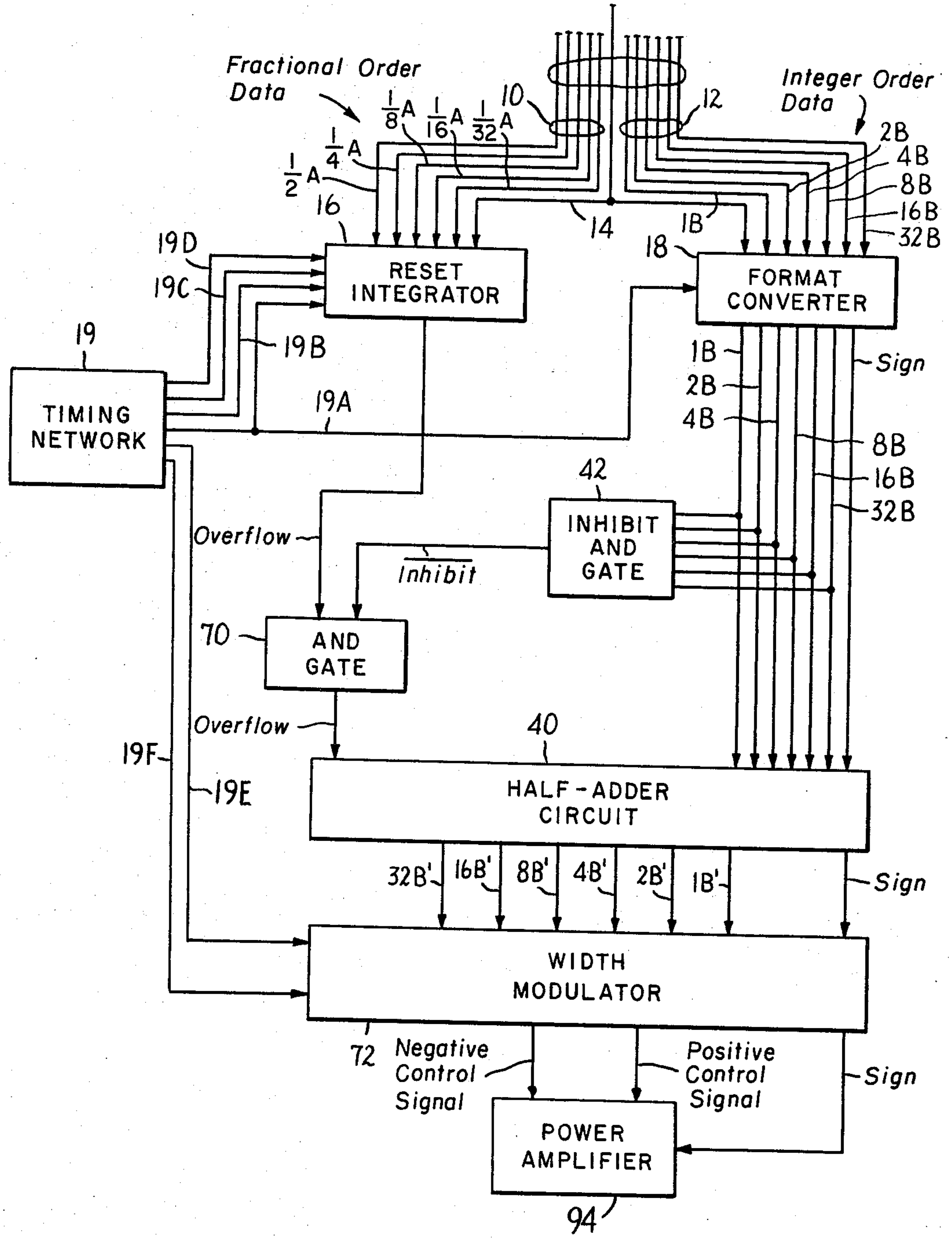
FIG. 1 is a schematic block diagram of a typical pulse-modulating device arranged according to the present invention.
Figure 2:
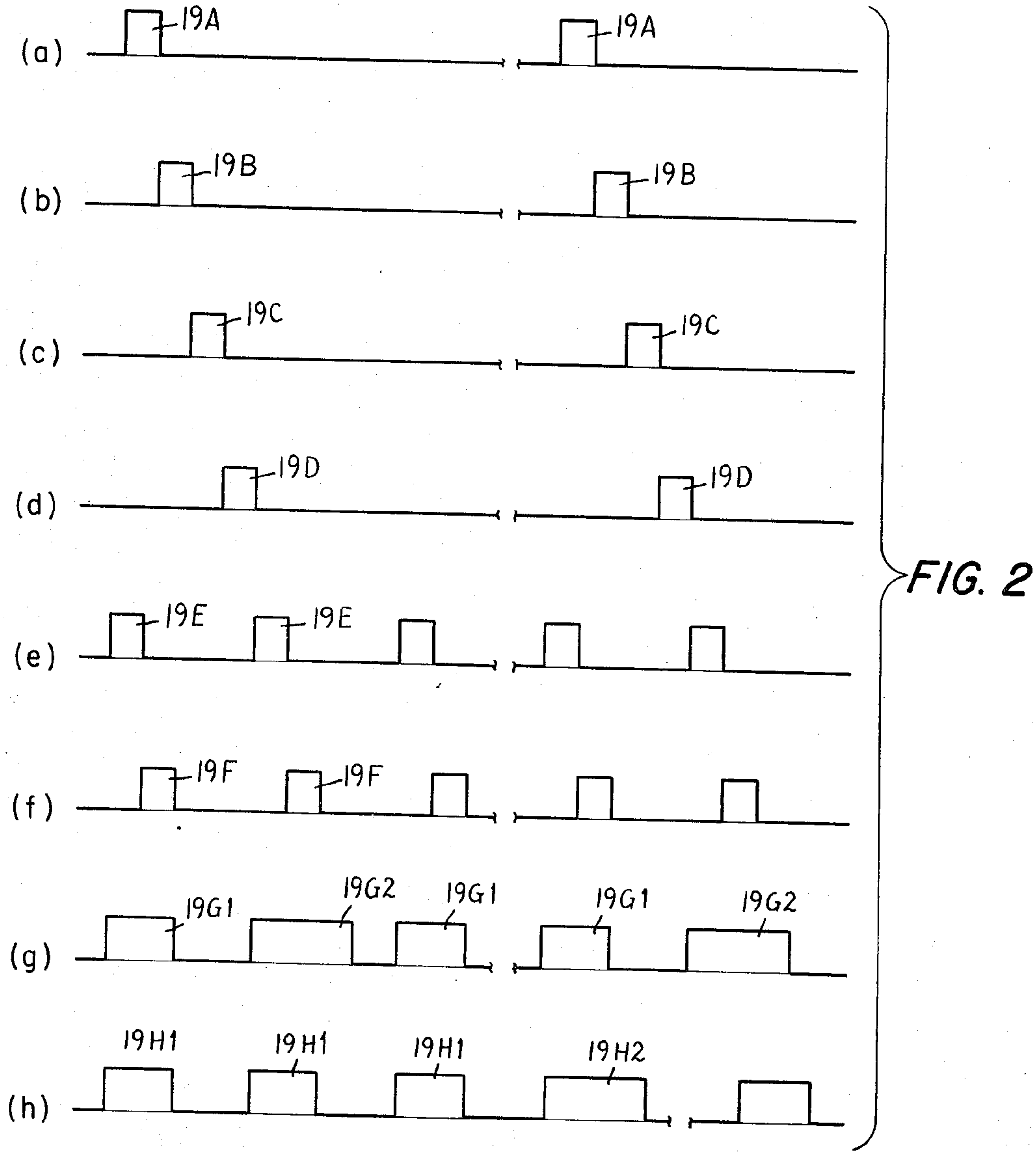
FIG. 2 graphically illustrates certain waveforms useful in explaining the operation of the pulse-modulating device of FIG. 1.

In accordance with the present invention therefore and referring to FIG. 1, a digital input signal is conducted over a pair of multi-conductor cables 10 and 12 and a single conductor 14. In the embodiment shown in FIG. 1, the cable 10 carries five bits of fractional order data labeled 1/2A, 1/4A, 1/8A, 1/16A and 1/32A and representative of frequency information, and supplies such data to the input terminals of a reset integrator 16. A format converter 18 is supplied with the six bits of integer order data, labeled 32B, 16B, 8B, 4B, 2B and 1B, representative of magnitudinal information carried by the cable 12, and the conductor 14 transmits the sign bit of the digital input signal to the input terminals of both the integrator 16 and the format converter 18. The integrator 16 and the format converter 18 are also supplied with timing pulses generated by a timing network 19. The network supplies a first timing pulse 19A to both the integrator 16 and the converter 18 and a second, third and fourth delayed timing pulses 19B, 19C and 19D to the integrator 16. As shown in FIG. 2, the pulses occur at a constant frequency.

Figure 3:
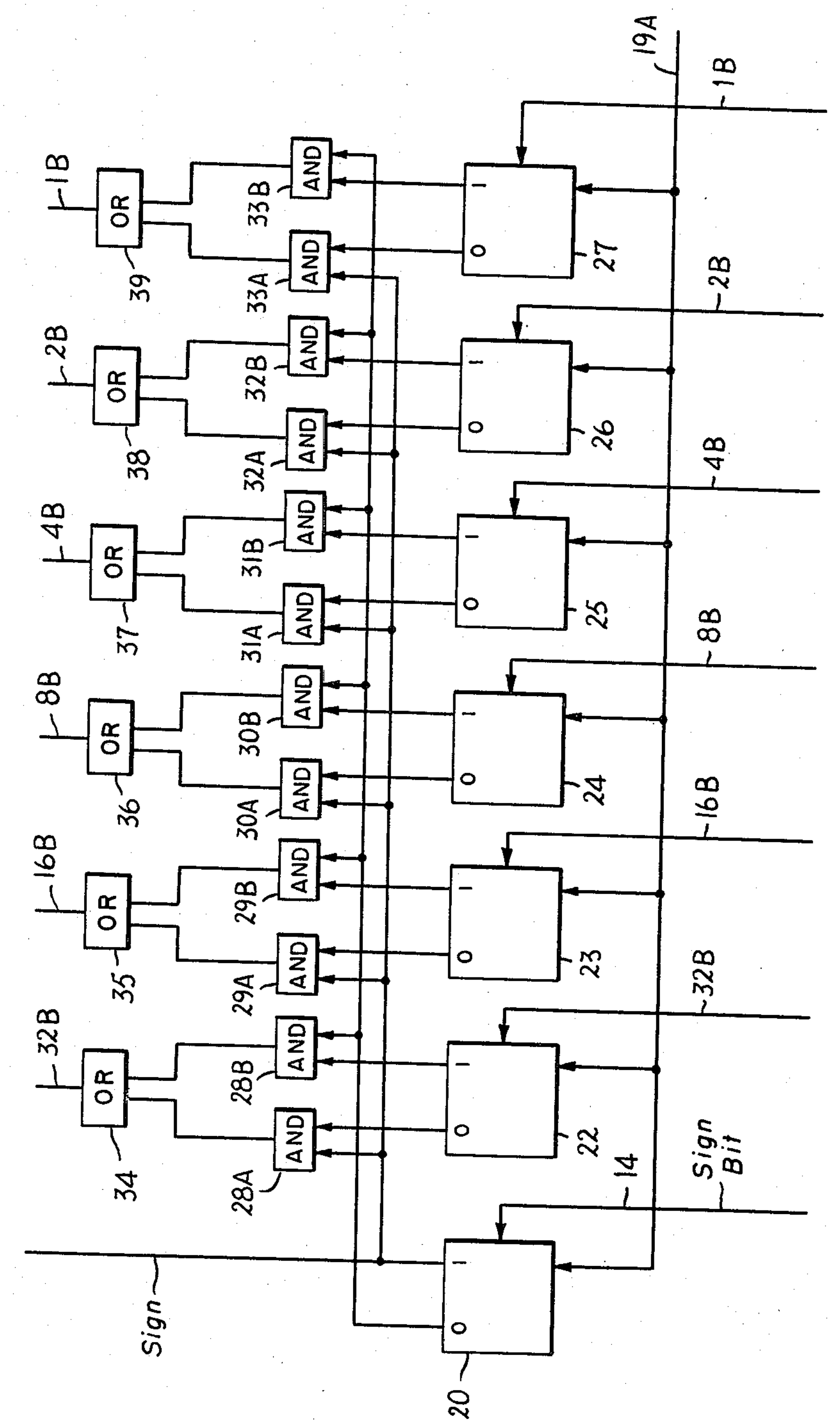
FIG. 3 is a schematic block diagram of the format converter forming part of the device of FIG. 1.

Referring to FIG. 3, the format converter 18 comprises a flip-flop circuit 20 to which the sign bit of the digital input signal is applied and six flip-flop circuits 22–27 to which the integer order bits of the input signal are applied. The flip-flop 20 stores the sign bit and the flip-flops 22–27 store the integer order components 32B, 16B, 8B, 4B, 2B and 1B in logical form at clock time 19A. For example, if the bit at position 32B is a "1" at clock time 19A, the flip-flop circuit 22 will be set to the "1" state. If the bit at position 32B is a "0" at clock time 19A, the flip-flop circuit 22 will remain in its reset or "0" state.

The reset and set sides of the flip-flop circuits 22–27, respectively, are connected to the input terminals of separate AND gates 28A, 28B; 29A, 29B; 30A, 30B; 31A, 31B; 32A, 32B and 33A, 33B. The other input terminals of the gates 28A, 29A, 30A, 31A, 32A and 33A are coupled to the "1" side of the sign flip-flop circuit 20 and the other input terminals of the AND gates 28B, 29B, 30B, 31B, 32B and 33B are coupled to the "0" side of the sign flip-flop circuit 20. Associated with the groups of AND gates are six OR gates 34–39 to which the output terminals of the AND gates are connected. As is understood in the art, the OR gates produce positive or "1" signals in response to a positive signal being applied to either of the input terminals.

The arrangement of the format converter 18 is such as to produce a one's complement conversion of each integer order bit if the sign flip-flop 20 is in its "1" state, i.e., a negative sign bit. Specifically, when the flip-flop 20 is in its "1" state, the output signal therefrom tends to enable gates 28A, 29A, 30A, 31A, 32A and 33A. Thus, the signals from the flip-flops that have been set to their "0" states will enable the AND gates to produce "1" signals. Similarly, "1"'s accumulated by the flip-flops 22–27 will be transmitted as "0" signals. When the sign flip-flop is in its "0" state, the "1"'s accumulated by the flip-flops 22–27 will be transmitted by the AND gates 28B–33B and the OR gates 34–39.

The "1" side of the sign flip-flop 20 is coupled by way of a conductor labeled sign to the input terminal of a half-adder circuit 40 (FIG. 1). The output terminals of the OR gates 34–39 are connected by way of the conductors labeled 32B, 16B, 8B, 4B, 2B and 1B to the input terminals of a six input inhibit AND gate 42 and to a corresponding number of input terminals of the half-adder circuit 40.

Figure 4:
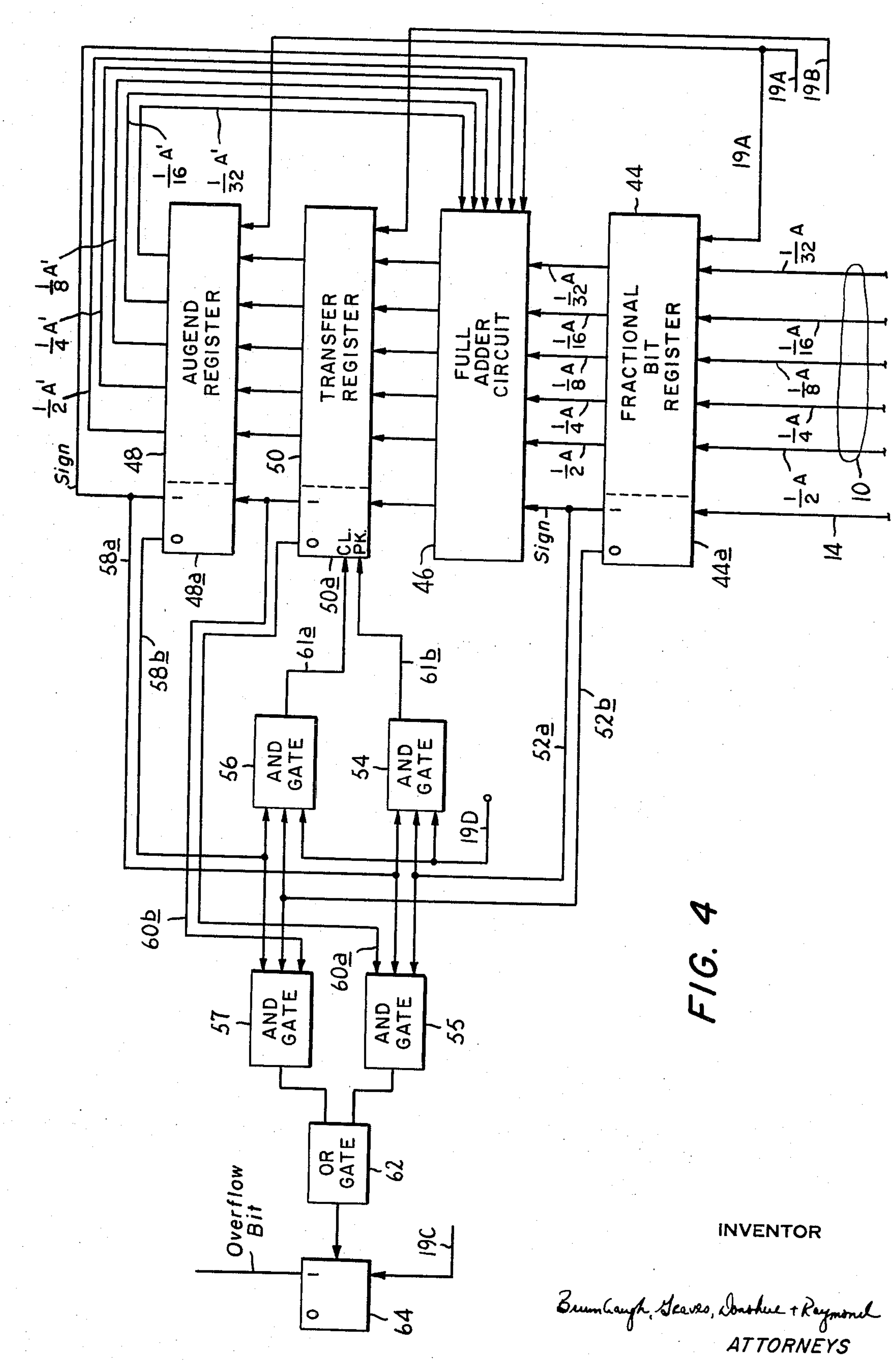
FIG. 4 is a schematic block diagram of the reset integrator forming a part of the device of FIG. 1.

Referring now to FIG. 4, the reset integrator 16 comprises a fractional bit register 44 comprising, for example, five flip-flop circuits for storing the binary representations of the fractional order data and a sixth flip-flop **44*a* for storing the sign bit of the input signal. The conductors 1/2A, 1/4A, 1/8A, 1/16A and 1/32A carry the fractional order data to the register 44, while the conductor 14 carries the sign bit to the flip-flop 44*a*. At the beginning of each operational cycle the clock pulse 19A (FIG. 2) transfers the input data and the sign bit into the register 44 and the flip-flop 44*a***, respectively.

The stored fractional order bits and the sign bit are transferred from the register 44 by way of the correspondingly labeled conductors to the first input terminals of the full adder circuit 46. The second input terminals of the full adder circuit 46 receive the previously received fractional data bits labeled 1/2A′, 1/4A′, 1/8A′, 1/16A′ and 1/32A′ accumulated in an augend register 48 and the corresponding sign bit appearing in flip-flop **48*a*. In the full adder circuit 46 the fractional order bits 1/2A–1/32A and the sign bit are added to the previously stored fractional order bits 1/2A′–1/32A′ and the corresponding sign bit to produce a sum signal. In summing, the sign bits are treated as numerical bits. When the delayed clock pulse 19B (FIG. 2) is applied to the set input terminals of the transfer register 50, the sum signal is stored in the register 50. During the next operational cycle and upon the occurrence of the timing pulse 19A, the contents of the transfer register 50 are transferred into the augend register 48**.

The augend register 48 also includes a sign bit flip-flop **48*a* which registers the sign bit of the sum signal transferred to the augend register from the full adder circuit 46 by way of the transfer register 50. The transfer register 50 also includes a flip-flop 50*a* which, upon the application of the timing pulse 19B, stores the bit in the sign position of the sum signal produced in the full adder circuit 46**.

In the operation of the reset integrator 16 and during each operational cycle, the fractional order bits and the sign bit are transferred to the fractional bit register 44 upon the occurrence of the timing pulse 19A. The fractional order bits and the sign bit are then added in the full adder register 46 to the fractional order bits and the corresponding sign bit previously stored in the augend register 48. Upon the occurrence of timing pulse 19B, the sum signal is transferred to the transfer register 50. If the absolute value of the sum signal accumulated by the adder circuit 46 exceed the number 1, an overflow condition exists. This condition will exist only when the states of **44*a* and 48*a* are alike (both are "1" or both are "0") and the state of 50*a* is different from both states 44*a* and 48*a*. The register 50 contains the correct remainder at all times and this remainder is transferred to the augend register 48** during the next operational cycle.

The output terminals of the sign bit flip-flop **44*a* in the fractional bit register 44 are coupled by way of conductors 52*a* and 52*b* to the input terminals of two sets of AND gates 54, 55 and 56, 57, respectively. A pair of conductors 58*a* and 58*b* couple the set and reset output terminals of the sign bit flip-flop 48*a* in the augend register 48 to the input terminals of the AND gates 54, 55 and the gates 56, 57, respectively. The third input terminals of the AND gates 55 and 57 are connected by way of the conductors 60*a* and 60*b* to the reset and set sides of the overflow flip-flop 50*a* in the transfer register 50, and the third input terminals of the AND gates 54 and 56 are tied together and have supplied thereto the timing pulse 19D** each operational cycle.

The AND gate 55 is enabled whenever flip-flop **50*a* is in a "0" state and the flip-flops 44*a* and 48*a* are in their "1" states to indicate an overflow accumulation of a negative signal in the adder circuit 46 and the transfer register 50, 50*a*. Similarly, the gate 57 is enabled whenever flip-flop 50*a* is in a "1" state and the flip-flop circuits 44*a* and 48*a* are in their "0" states to indicate an overflow accumulation of a positive signal in the adder circuit and the transfer register 50, 50*a***.

Like the AND gates 55 and 57, the AND gates 54 and 56 tend to be enabled when the same sign bit indication has been stored in the sign bit flip-flops **44*a* and 48*a*. Upon the occurrence of the timing pulse 19D at the end of the operational cycle one or the other of the AND gates will be enabled. The output terminal of the AND gate 56 is coupled to the clear input terminal of the overflow flip-flop 50 by a conductor 61*a*. The timing pulse 19D is transmitted by AND gate 56 when both flip-flop circuits 44*a* and 48*a* are in a "0" state, thereby causing the flip-flop 50*a* to be reset to its "0" state. Similarly, a conductor 61*b* couples the output terminal of the AND gate 54 to the preset input terminal of the overflow flip-flop 50*a*. When both flip-flop circuits 44*a* and 48*a* are in a "1" state, the gate 54 transmits the timing pulse 19D to the overflow flip-flop 50*a*** to set the flip-flop into its "1" state.

The output terminals of the AND gates 55 and 57 are connected to the input terminals of an OR gate 62. When either AND gate 55 or AND gate 57 is enabled, the signal supplied by the enabled AND gates enables the OR gate 62. The output terminal of the OR gate 62 is connected to the signal input side of a flip-flop circuit 64. When an overflow bit has been detected, the flip-flop 64 stores the overflow bit upon the occurrence of the timing pulse 19C. The overflow bit is transmitted from the flip-flop circuit 64 along the conductor labeled "overflow bit."

Referring again to FIG. 1, the integer order data is transmitted from the format converter 18 along the conductors labeled 1B–32B to the input terminals of the inhibit AND gate 42 and to the input terminals of the half-adder circuit 40. The conductor labeled "sign" carries the binary representation of the sign of the integer order data to still another input terminal of the half-adder circuit 40. The inhibit AND gate 42, which may be of conventional construction, is designed to generate an inhibit signal whenever the magnitude of the integer order data is equal to its saturation value of 63. In such situation, a "0" appears at the output terminal of gate 42. At all other times, the output terminal of gate 42 is at the "1" level.

The output terminal of the gate 42 is coupled by way of a conductor labeled $\overline{\text{inhibit}}$ to one input terminal of an AND gate 70. Each overflow signal produced by the reset integrator 16 is coupled to the AND gate 70 and transmitted thereby to the another input terminal of the half-adder circuit 40 so long as the inhibit AND gate 42 remains disabled. Thus, the arrangement of the gates 42 and 70 inhibits an overflow pulse from being transmitted to the half-adder circuit 40 when the magnitude of the integer order data is equal to its saturation value of 63. In the half-adder circuit 40, which may be of conventional construction, the overflow signal is added to the integer order data to produce a sum signal. From the half-adder circuit 40, the sum signal is supplied to a width modulator 72 over the conductors labeled 1B′, 2B′, 4B′, 8B′, 16B′ and 32B′. The sign bit of the integer order data is also transmitted to the width modulator circuit by way of the half-adder circuit 40.

Figure 5:
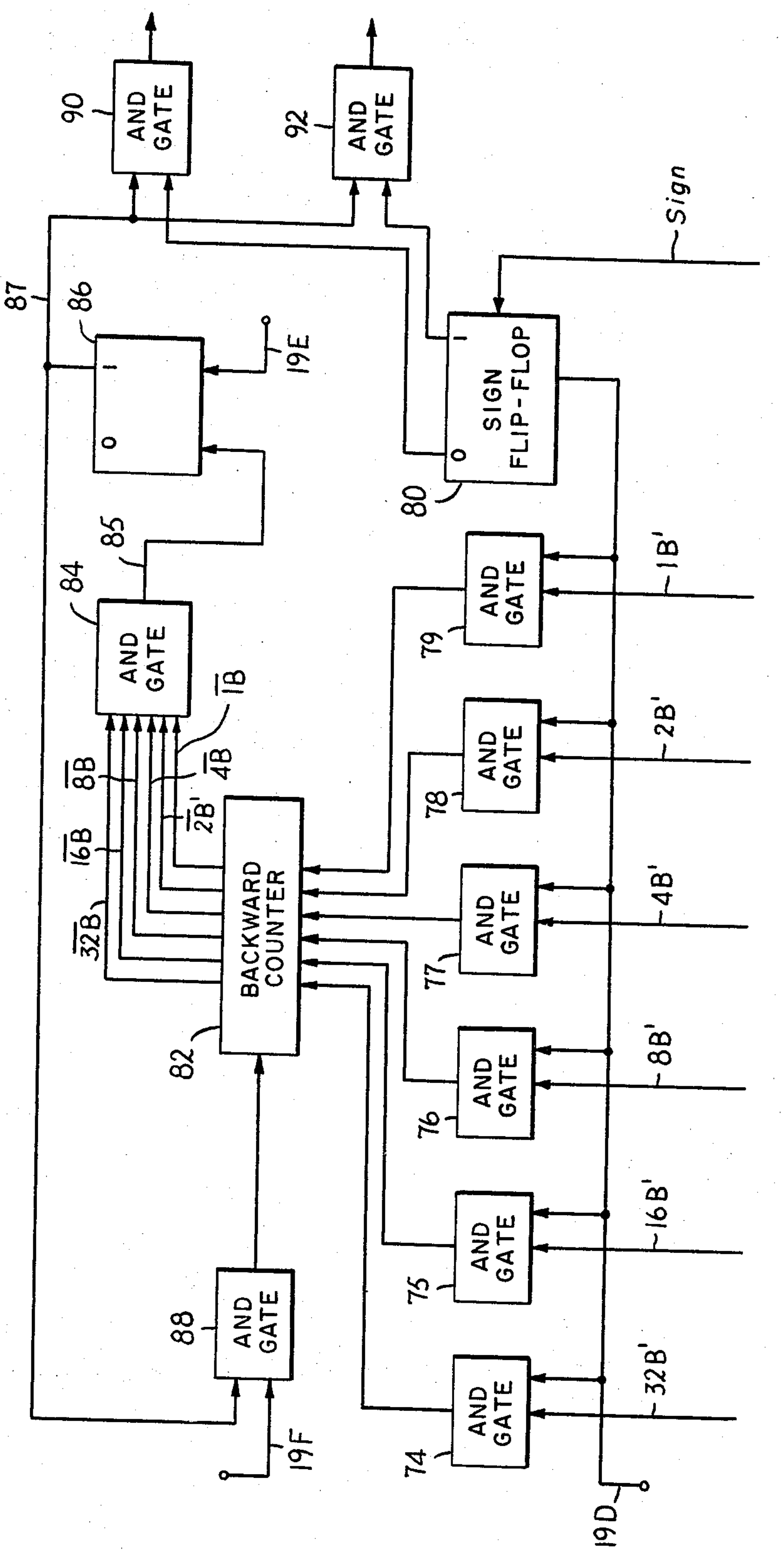
FIG. 5 is a schematic block diagram of the width modulator forming a part of the device of FIG. 1.

Referring now to FIG. 5, the width modulator 72 generates output pulses whose width is proportional to the magnitude of the sum signal accumulated in the half-adder circuit 40. To this end, the resulting integer order bits identified as 1B′–32B′ are coupled over correspondingly labeled conductors to the input terminals of a plurality of AND gates 74–79 within the width modulator 72. The sign bit is coupled over the labeled conductor to a sign flip-flop circuit 80 situated within the width modulator. Upon application of the timing pulse 19D (FOG. 2) to the other input terminals of the AND gates 74–79 and to the set side of the sign flip-flop 80, the AND gates having data supplied thereto transmit data pulses constituting a sum signal to a backward counter circuit 82 and the sign of the accumulated data is stored in the sign flip-flop circuit 80.

The backward counter 82, which may be of conventional construction, stores the sum signal supplied thereto and, when supplied with timing pulses, counts backwardly until a zero bit accumulation is set in the counter. The reset output terminals of the backward counter 82 are coupled by way of the conductors labeled $\overline{1B}'$, $\overline{2B}'$, $\overline{4B}'$, $\overline{8B}'$, $\overline{16B}'$ and $\overline{32B}'$ to the input terminals of a six input AND gate 84. As will be understood, the AND gate 84 is enabled only when the backward counter 82 has been set to its zero state. A conductor 85 couples the output terminal of the AND gate 84 to the reset input terminal of a flip-flop circuit 86. When the AND gate 84 is enabled, the signal produced thereby resets the flip-flop 86 into its zero state upon the occurrence of a 19E pulse first appearing after gate 84 is enabled.

Referring again to FIGS. 1 and 2, a train of pulses 19E, and a train of pulses 19F are supplied by the timing network 19 to the input terminal of the width modulator 72. These pulses are supplied to one input terminal of the AND gate 88 situated within the modulator 72 (FIG. 5). As shown in FIG. 5, the timing pulses 19E are supplied to the clock input terminal of the flip-flop 86 and will drive the flip-flop 86 into its "1" state if the output of gate 84 is "0." The flip-flop will remain in the "1" state until the first 19E pulse following the appearance of a "1" at the output terminal of gate 84.

The "1" side of the flip-flop 86 is coupled by way of a conductor 87 to the second input terminal of the AND gate 88 and to the input terminals of a pair of output AND gates 90 and 92. The other input terminal of the AND gate 90 is coupled to the reset side of the sign flip-flop 80 such that the gate generates a signal when the sign of the sum signal is positive. The other input terminal of the gate 92 is coupled to the set side of the flip-flop 80 and generates an output when the sign of the sum signal is negative. As long as the flip-flop 86 is set to its one state, the AND gate 88 will conduct the timing pulses 19F to the backward counter 82. In response to each of the timing pulses 19F, the backward counter reduces its state by the count of one,as is understood in the art.

In the operation of the width modulator therefore and with particular reference to FIGS. 2 and 5, assume that a constant positive signal of magnitude M is applied to the AND gates 74–79. By virtue of the timing pulses 19F having reduced the count in the counter 82 to zero, the AND gate 84 is enabled and the flip-flop 86 is maintained in its zero state. Upon the occurrence of the timing pulse 19D generated by the timing network 19, the backward counter 82 is set to its M state to thereby disable the gate 84. If the sign is positive the sign flip-flop 80 is simultaneously switched to its reset state such that the AND gate 90 tends to be enabled.

The first of the timing pulses 19E then sets the flip-flop 86 into its "1" state to mark the beginning of the output pulse and the enabling of the AND gate 88. The output pulse exits through the AND gate 90. Upon the occurrence of the first of the timing signals 19F, the AND gate 88 is rendered momentarily conductive to transmit a pulse into the backward counter 82 to reduce its state to M–1. The sequential occurrence of the timing signals 19F will continue to reduce the count in the counter 82 until the counter is brought to its zero state. At this time the AND gate 84 will be rendered conductive to drive the flip-flop 86 into its zero state at the next 19E pulse. The next operational cycle begins upon the next occurrence of the pulse 19D. The response of the width modulator 72 to step inputs can be expressed by the summation formula:

$$i(t) + \sum_{j=0}^{r} U(t-jT) - \sum_{j=0}^{s} U(t-jT-bT)$$

where:

$U(t-jT)$ = Unit step at $t=jT$
$T$ = Clock period
$bT=km$ = Width of the output pulse
$m$ = Magnitude of the input quantity
$k$ = Proportionality constant
$s=r-1$ when $jT<t<(j+b)T$
$s=r$ when $(j+b)T<t<(j+1)T$ In view of the foregoing, it will be understood that the width modulator 72 produces output pulses having fixed frequencies and widths that are modulated in accordance with the magnitude of the sum signal produced in the half-adder circuit 40. FIGS. 2G and 2H illustrate the pulse response of the pulse width modulating device of the instant invention. As shown in FIG. 2G, where the varying input signal comprises an integer order bit of two (2) and a fractional order bit of one-half (½), the width of the input pulses 19E is at least doubled during every operational cycle by virtue of the magnitude of the integer order data. On every other cycle, an overflow bit is added to the integer order bit to width modulate the input pulse 19E by a factor of three. This results in a control pulse train having components 19G1 and 19G2. As shown in FIG. 2H, where the input signal comprises an integer order bit of two and a fractional order bit of one-quarter, the widths of the pulses 19E are doubled for three consecutive cycles and tripled every fourth cycle resulting in an output pulse train having components 19H1 and 19H2.

From the modulator 72, the width modulated positive control pulses or the width modulated negative control pulses are supplied over the labeled conductors to a power amplifier 94 which may be for example, of the type described in the NEREM Record, November, 1966, pp. 250–251 and entitled "An Integrated Power Amplifier for the Saturn Vehicle Inertial Platform Gimbal Torquers." The sign bit is also coupled to the amplifier 94 in order to enable the amplifier to respond to either the positive or negative input control signals as determined by the sign of the varying input signals.

It will be understood that the invention is susceptible to considerable modification and not limited to the above-described illustrative embodiment. For example, the system could be designed to accept analog inputs instead of digital inputs, and still output a pulse train that has been pulse-width-frequency modulated. Furthermore, the digital modulator described above could be used in any analog system if an analog-to-digital converter were incorporated into the control circuitry. Accordingly, all such modifications and variations within the skill of the art are included within the spirit and intent of the invention as defined by the following claims.

We claim:

1. In a pulse-width frequency modulating system for modulating a train of pulses in accordance with the values of first and second digital input signals, the improvement comprising modulating circuit means, said modulating circuit means comprising first circuit means for width modulating the pulses of the pulse train in accordance with the magnitudinal information of the first signal and second circuit means for further modulating the widths of certain pulses in the pulse train in accordance with the magnitudinal information of the second input signal.

2. A pulse-width frequency modulating system according to claim 1 wherein the first digital input signal includes a first group of bits representative of integer order data and the second digital input signal includes a second group of bits representative of fractional order data and wherein the first circuit means width modulates the pulse train in accordance with the magnitude represented by integer order bits and the second circuit means modulates the widths of certain pulses in the pulse train at a frequency determined by the magnitude of the fractional order bits.

3. A pulse-width frequency modulating system as defined in claim 2 wherein the second circuit means comprises means for accumulating the fractional order bits until the accumulation equals at least the value of the least significant bit of the integer order data and adder means for adding the accumulation of the integer order data to add an increment of width modulation to the pulse then being modulated by the first circuit means.

4. A pulse-width frequency modulating system according to claim 3 wherein each digital input signal includes a sign bit, an integer order component weighted in positive powers of 2 and a fractional order component weighted in negative powers of 2 and wherein the first circuit means comprises format converter means having a first means for detecting the presence of a negative sign bit and a second means responsive to the detection of a negative sign bit for producing a one's complement conversion of each integer order bit.

5. A pulse-width frequency modulating system according to claim 3 further comprising detector means for detecting the presence of the first group of integer order bits representative of a maximum value for disabling the adding means to preclude the addition of the accumulation to the integer order data.

6. A pulse-width frequency modulating system according to claim 3 wherein the first circuit means further includes width modulating circuit means responsive to the addition of the accumulation and the integer order data and responsive to the pulse train for producing a corresponding train of pulses wherein the widths of the individual pulses are proportional to the addition of the accumulation and the integer order data.

* * * * *